United States Patent
Kaufman

Patent Number: 5,425,226
Date of Patent: Jun. 20, 1995

[54] RAKE-HOE DEVICE OF SINGLE PIECE CONSTRUCTION

[76] Inventor: PaulYaH E. Kaufman, 1008 Lakemont Ave., Winter Park, Fla. 32789

[21] Appl. No.: 270,424
[22] Filed: Jul. 5, 1994
[51] Int. Cl.[6] .......... A01D 7/00; A01B 1/20; A01B 1/22
[52] U.S. Cl. .......... 56/400.06; 172/375; 403/354
[58] Field of Search .......... 56/400.05, 400.06, 400.07; 172/371, 375, 376, 377, 378; 403/263, 354

[56] References Cited

U.S. PATENT DOCUMENTS

| | | | |
|---|---|---|---|
| D. 230,247 | 2/1974 | Parry | 172/375 X |
| 1,469,144 | 9/1923 | Harris | 56/400.06 |
| 1,528,843 | 3/1925 | Olesen | 56/400.05 X |
| 1,665,183 | 4/1928 | Urban | 172/375 |
| 2,331,414 | 10/1943 | Morres | 172/375 |
| 2,597,954 | 5/1952 | Schaller | 56/400.06 X |
| 3,164,213 | 1/1965 | Lutz | 56/400.06 X |
| 5,025,621 | 6/1991 | DeMarco | 56/400.05 |

FOREIGN PATENT DOCUMENTS

| | | | |
|---|---|---|---|
| 26793 | 2/1908 | Sweden | 56/400.05 |
| 124284 | 1/1928 | Switzerland | 56/400.06 |

Primary Examiner—David J. Bagnell
Attorney, Agent, or Firm—James H. Beusse

[57] ABSTRACT

A combination rake/hoe device integrally formed on a common structural member and usable in an alternative arrangement with an elongated handle includes a rake portion having a series of rake teeth mounted in a spaced, substantially parallel array along the length of the common structural member from a first to a second end thereof and a hoe blade mounted on the structural member at a location approximately midway between the first and second end with the hoe blade extending oppositely of the rake teeth from the structural member. The hoe blade has a sharpened edge substantially parallel to the structural member and extending about one-half the length between the first and second ends. A Y-shaped mounting member integrally formed with the structural member has a pair of arms extending from respective ones of the first and second ends to a common junction at a base member. The base member has a generally flat configuration with at least one hole for receiving a bolt for attaching the base member to the handle.

3 Claims, 2 Drawing Sheets

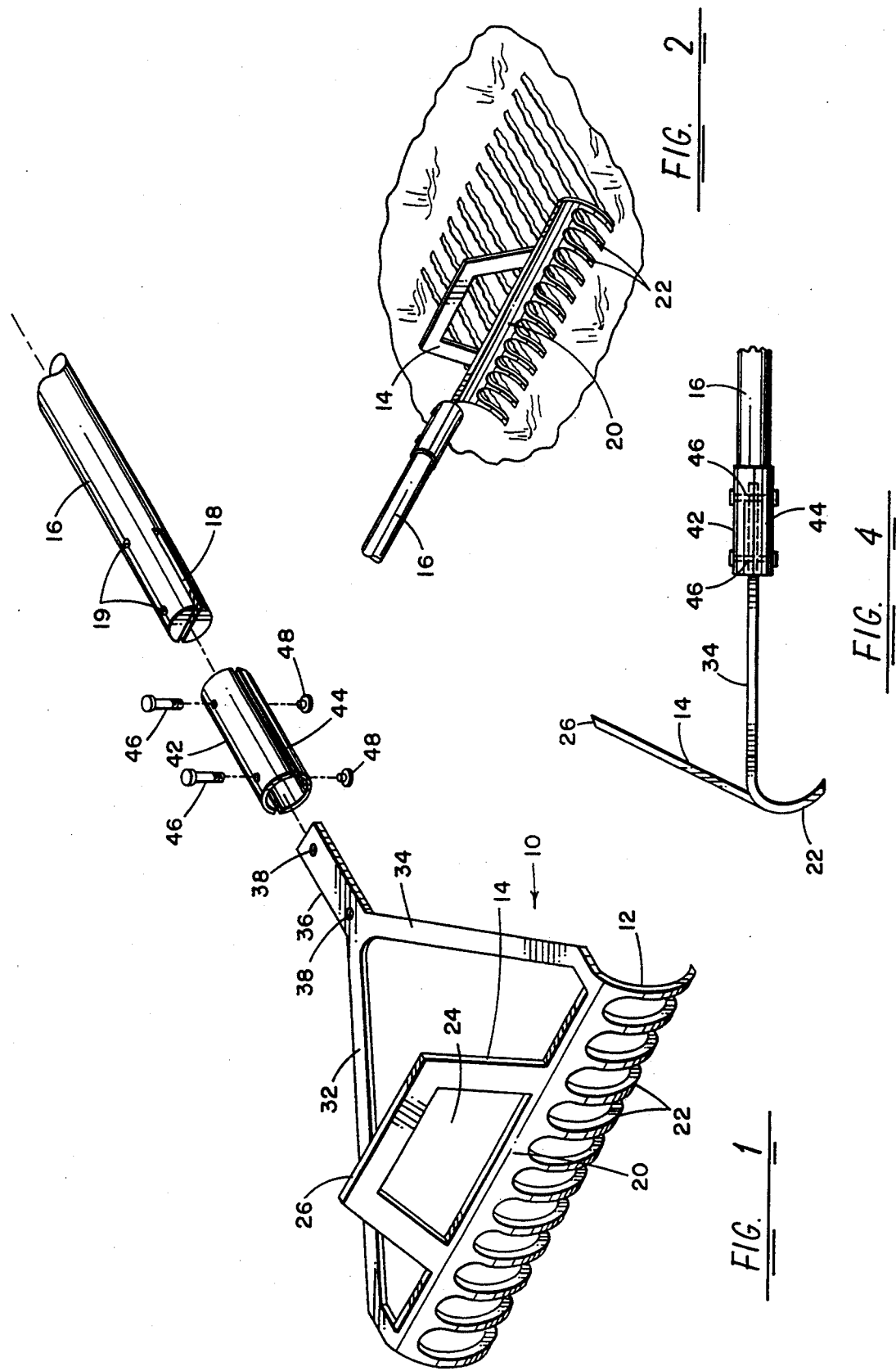

RAKE-HOE DEVICE OF SINGLE PIECE CONSTRUCTION

BACKGROUND OF THE INVENTION

For countless generations the soil has been cultivated in connection with the growing of plants for food, but in addition, many gardens are maintained by way of beautification of a landscape. For whatever the reason the soil is cultivated, it has usually been necessary for the farmer or gardener to maintain several different tools on hand, so that the soil can be tilled in a manner commensurate with soil conditions, the weather and the like. Although a large variety of power tools have been available for use for many years, there is still an ample basis for almost every home having manually operated implements such as rakes, hoes, shovels and the like.

It is well known that some rakes, often referred to as stone rakes, have a spaced series of hard tines of relatively short length, whereas other rakes, typically called leaf rakes, have a series of long, relatively flexible tines. The tines of a stone rake are ideal for pulling through the soil in order to obtain a smoothing and combing function. A stone rake also is useful for pulling up unwanted weeds, small stones and the like from the soil.

While tools of this type provide substantial benefit in cultivating soil and work very satisfactorily in most instances, their use in various combinations to cultivate soil is often inconvenient in that a variety of tools must be carried to and from the work location, and must thereafter be carefully placed away from the work area to avoid injury to the worker. In addition, substantial time is often lost in switching among such an array of cultivating tools.

Further, many homes have only a single car garage or other rather limited storage location for tools, making it highly desirable to minimize the number of tools that must be stored.

One prior art attempt to develop a multiple use tool is shown in U.S. Pat. No. 5,025,621 in which a bow-rake is formed with a miniature hoe blade on one end, a two-prong pick on an opposite end and a sifter formed as an extended portion of the support member for the tines of the rake. The sifter is the same width as the rake and extends oppositely from the rake tines about the length of the tines. This tool has the disadvantage that the hoe is awkward and small due to its attachment at the end of the tool, i.e., the tool is turned on its side to use the hoe and the balance is lost. Further, the bow-rake construction is inappropriate for a tool to be used for chopping as is common for a hoe. Attempts to use the sifter as a hoe are disingenuous due to both the broad width of the sifter and the shallow depth that can be achieved if the sifter is used for chopping at weeds. Still further, the attachment of a bow-rake to a handle is conventionally done by forcing the bow or yoke ends into an undersized aperture in the end of handle 12. Repeated use, particularly in a hoeing fashion, rapidly expands the aperture allowing the tool to slip from the handle.

It is for reasons such as these that I have designed a highly useful single piece rake-hoe combination of sturdy, yet inexpensive, construction.

SUMMARY OF THE INVENTION

It is an object of the present invention to provide a combination rake-hoe which overcomes the above and other disadvantages of the prior art. In one form, a rake-hoe device of single piece configuration in accordance with this invention utilizes a common structural member to which the rake portion and hoe portion are attached, with this novel implement being usable in what may be regarded as an alternative arrangement. The rake portion of the device involves a series of rake teeth mounted in a spaced, substantially parallel array along the length of the common structural member, with all of the teeth residing essentially in a common plane. A hoe member is integrally attached to the structural member at a location approximately midway between its opposite ends. The hoe member resides on the opposite side of the structural member from the rake teeth.

The hoe member has a sharpened edge substantially parallel to the structural member, and may be formed with a solid blade or with a mid portion of the hoe member being open. The hoe member is usable in different modes, one of which involves a chopping motion, such as when the user is chopping weeds or the like. When the hoe portion is being utilized in active contact with the ground, and being pulled toward the user, a blade with an open mid portion allows any encountered weeds or earth dug or cut by the hoe member to readily pass through the open mid portion of the hoe.

It is a principal object of my invention to provide a combination rake and hoe of sturdy, yet inexpensive, construction that is particularly convenient to use.

It is another object of my invention to provide a combination rake and hoe of single piece construction, involving no welds or other joints, nor any moving parts, thus reducing the likelihood of breakage.

It is yet another object of my invention to provide a combination rake-hoe that is of strong, yet lightweight, construction and that possesses good balance, thus being able to be used for relatively long periods of time without being tiring to the user.

It is yet still another object of my invention to provide a combination rake-hoe in which an aperture is provided in a central portion of the hoe portion of my device through which severed plants, weeds, dirt and the like can pass at such time as the hoe portion is being pulled toward the user, thus averting the creation of an unnecessary gouge mark or furrow and avoiding dirt being brought into contact with the user's lower extremities.

Another object of my invention is to construct a handle in such a way that it will not come apart during use.

Still another object of my invention is to provide a handle for a combination rake-hoe which can be easily replaced.

These and other objects, features and advantages will become more apparent from a study of the appended drawings.

BRIEF DESCRIPTION OF THE DRAWINGS

For a better understanding of the present invention, reference may be had to the following detailed description taken in conjunction with the accompanying drawings in which:

FIG. 1 is a perspective view of my novel rake-hoe combination revealing the separate rake portion and the separate hoe portion on a common structural member with the handle and the handle attachment portions shown in exploded relationship to the rake-hoe in order to reveal preferred attachment details;

FIG. 2 is a view to a smaller scale of the way my device functions when the teeth of the rake portion of my implement are in contact with the ground and the implement is being pulled toward the user;

FIG. 4 is an edge view of the combination implement shown in FIG. 3; and

DETAILED DESCRIPTION OF THE INVENTION

Figure 3:
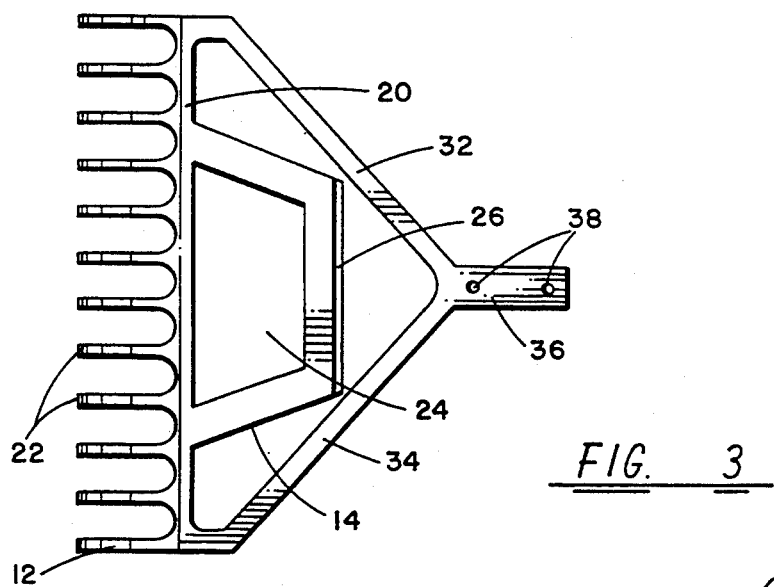
FIG. 3 is a plan view of my novel rake-hoe combination revealing how it may be of single piece construction, such as being stamped out of a single piece of sheet steel or cast, for example.

With initial reference to FIG. 1 it will be seen that I have shown my novel combination rake-hoe 10 of one piece configuration consisting of a rake portion or member 12 and a hoe portion or member 14 sharing a common handle 16. As will be seen in greater detail hereinafter, the rake portions and the hoe portion in accordance with this invention are integrally formed on a common structural member 20, with the rake portion on one side of the common structural member and the hoe portion on the opposite side of this member. The hoe portion is preferably located in a mid portion of the common structural member.

Figure 5A:
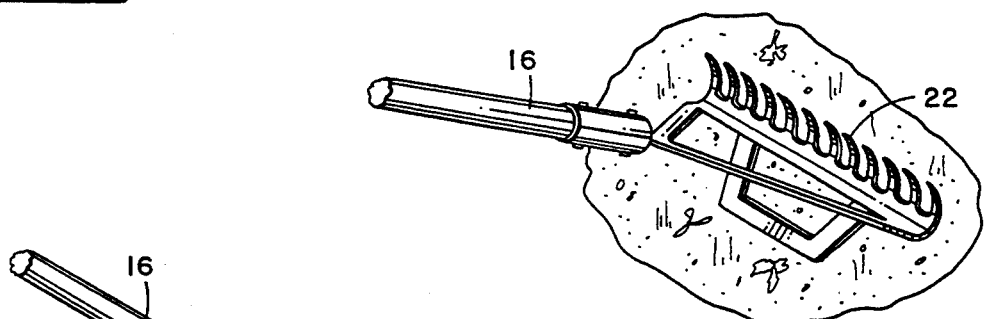
FIGS. 5a through 5c show the hoe portion of my novel combinational device in several stages of use.
Figure 5B:
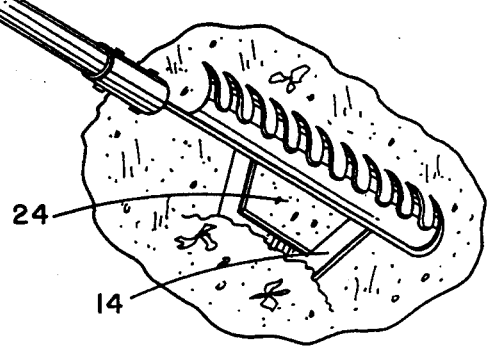
Figure 5C:
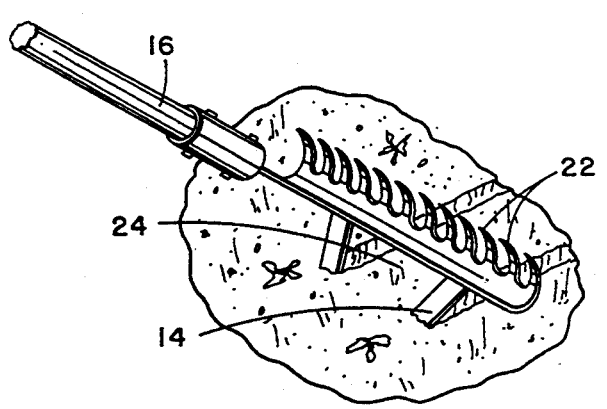

As is obvious from this arrangement, my novel implement is usable in an alternative arrangement. In other words, when the teeth of the rake are being used, such as in the manner shown in FIGS. 1 and 2, the hoe portion is in an inactive position, whereas when the hoe is being used, such as illustrated in FIGS. 5a through 5c, the rake portion is in an inactive position.

As made clear in FIGS. 1 and 3, the rake portion 12 principally involves a series or rake teeth 22 formed in a spaced, substantially parallel array along the length of the common structural member 20 with all of the teeth essentially residing in a common plane. Actually, the rake teeth 22 may possess a degree of curvature instead of being entirely flat, but I prefer, for convenience of explanation, to refer to the teeth as essentially residing in a common plane so as to avoid a connotation that some of the teeth may protrude either forward or rearward of the other teeth of the rake portion 12.

With regard to the hoe portion or member 14, it may be regarded as being in the common plane with the teeth 22 with this relationship best being seen in FIG. 4. Typically, the hoe portion 14 is flat and uncurved as is clearly visible in this latter figure.

The hoe portion 14 may be a solid plate or be formed with an open construction as shown in FIG. 1, having a fairly large aperture 24 provided for a reason to be discussed hereinafter in conjunction with FIGS. 5a through 5c with the hoe portion having a sharpened edge 26 that is essentially parallel with the common structural member 20.

As will be noted from FIGS. 1 and 3, the structural member 20 is preferably formed integrally with a Y-shaped mounting member 30 having a pair of side support arms 32, 34 and a base member 36 which functions as a mounting plate for the handle 16. The ends of the arms 32, 34 attach to opposite ends of the structural member 20. Each of the bars or arms 32 and 34 make approximately a 45° angle with the common structural member 20 and then meet at an intersection at base member 36. The base member 36 is preferably flat and is equipped with a pair of holes 38 therein that are utilized for the attachment of the handle 16.

With reference to FIGS. 1 and 4, it will be seen that the end of the handle 16 to be attached to my novel rake-hoe combination 10 is provided with a slot 18 of a thickness and length such that it can tightly receive the base member 36 with holes 19 being provided in a spaced relationship in this end of the handle, which holes are in alignment with the holes 38 provided in the base member 36.

To give strength to the arrangement, I preferably utilize brace members which take the form of an upper semi-cylindrical member 42 and a lower semi-cylindrical member 44 that are designed to closely encompass the end of the handle 16 in the immediate vicinity of the slot 18. Quite understandably, the upper and lower semi-cylindrical members 42 and 44 are each provided with a spaced pair of holes for receiving a pair of bolts 46 having threads on their respective shank portions. When the holes of the various components have been brought into alignment, the bolts 46 are intended to extend through the holes in the brace members 42 and 44, through the holes 19 in the handle, and through the holes 38 in the mounting plate 36. Nuts 48 are threadedly received on the threaded ends of the bolts 46, which nuts are carefully tightened so as to prevent the handle becoming loose in use.

One of the novel features of my novel rake-hoe combination is that the rake and hoe portions as well as the bars or arms 32 and 34 and the mounting plate 36 are preferably of one piece construction, and as best seen in FIG. 3, these components can be stamped or otherwise formed out of a single sheet of steel or can be formed by casting in a mold. In other words, no bolts or welds are utilized at the locations where the bar or arm 32 and the bar or arm 34 meet with respective ends of the common structural member 20. This highly advantageous construction serves to minimize manufacturing expense, and in addition results in a very strong and sturdy arrangement.

When the device depicted in FIG. 3 has been formed, the hoe portion 14 preferably extends at an angle to the plane in which the bar or arm 32 and the bar or arm 34 are located. Although I am not to be limited to any particular angle, I have found it preferable for the angle between the hoe portion 14 and the plane of the bars or arms 32 and 34 to be approximately 80°.

As previously mentioned, although the rake portion 12 and the hoe portion 14 are on opposite sides of the common structural member 20, they nevertheless may be regarded as being in a common plane. I prefer to describe my invention in this manner despite the fact that as shown in FIGS. 1, 4, and certain other figures, the teeth 22 may possess some curvature and the hoe portion extends angularly with respect to the plane of arms 32, 34. In one particular embodiment, the rake portion has twelve teeth 22, each approximately 4.5 inches long, although I obviously am not to be limited to this.

It is also to be noted that while I am not to be limited to any particular dimensions, the steel sheet or wrought iron out of which my novel rake-hoe combination is made can be of $\frac{1}{4}''$ thickness, but as is obvious, the sheet material can in certain instances be either thicker or thinner than $\frac{1}{4}''$.

I have previously mentioned that the hoe portion 14 is placed on the common structural member 20 in a symmetrical relationship to the rake teeth 22, and by way of example, the base portion of the hoe member 14 may be approximately the same width as is occupied by six of the twelve rake teeth. I have found it advantageous for the height of the hoe portion to be approximately the same as its width. By height I mean to refer to the distance between the near edge of the common structural member 20, and the sharpened edge 26 of the hoe portion. As discussed above, the width of the hoe portion should be about that of a conventional hoe, e.g., about eight inches. If the hoe portion is wider, it becomes impractical to use, both because of its weight and the volume of earth which would be moved by a wider hoe. However, I am not to be limited to this, and the hoe member could be either wider or narrower than the described relationship.

With reference now to related FIGS. 5a through 5c, it will be noted in these figures that I have shown the handle 16 having been rotated such that the hoe portion 14 is in the active position, meaning of course that the teeth 22 of the rake portion 12 are extending essentially upwardly. In FIG. 5a, the handle 16 is shown in a raised position preparatory to the user striking the ground with the sharpened edge 26 of the hoe portion 14, with this being associated, for example, with a user chopping weeds by the use of the hoe portion.

In FIG. 5b, I show the sharpened edge 26 of the hoe portion having been brought into contact with the ground, having completed, for example, a chopping stroke with this novel implement.

In FIG. 5c, I show the sharpened edge 26 of the hoe portion in a digging relationship to the earth, with the common structural member 20 being essentially parallel to the earth. Significantly, because of the relatively large aperture 24 I utilize in the hoe portion 14, when the hoe blade is in active contact with the ground and the implement is being pulled toward the user, any encountered weeds or earth can readily pass through the open mid portion 24 of the hoe 14 while the roots are being severed by cutting edge 26. This feature reduces the build-up of masses of earth and weeds in front of the hoe face.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A combination rake/hoe device integrally formed on a common structural member and usable in an alternative arrangement with an elongated handle, the rake portion of said device involving a series of rake teeth mounted in a spaced, substantially parallel array along the length of said common structural member from a first to a second end thereof, a hoe blade mounted on said structural member at a location approximately midway between said first and second end, said hoe blade extending oppositely of said rake teeth from said structural member, said hoe blade having a sharpened edge substantially parallel to said structural member and extending about one-half the length between said first and second ends, and a Y-shaped mounting member integrally formed with said structural member, said mounting member having a pair of arms extending from respective ones of said first and second ends to a common junction at a base member thereof, said base member having a generally flat configuration with a pair of spaced holes formed therethrough for receiving bolts for attaching said base member to said handle, said handle including a slit adapted for receiving said base member, and including a pair of braces shaped to fit about said handle and having apertures alignable with said holes in said base member whereby said handle is attachable to said base member by bolts passing through said braces, said handle and said base member.

2. The combination rake/hoe device of claim 1 wherein said hoe portion is formed with a mid portion removed.

3. The combination rake/hoe device of claim 1 wherein said hoe blade has a width of about eight inches.

* * * * *